United States Patent [19]

Egraz et al.

[11] Patent Number: 5,569,702

[45] Date of Patent: * Oct. 29, 1996

[54] GRINDING AND/OR DISPERSING AGENT CONTAINING POLYMERS AND/OR COPOLYMERS PARTIALLY NEUTRALIZED BY MAGNESIUM FOR AQUEOUS SUSPENSIONS OF MINERAL SUBSTANCES, TO BE USED IN PIGMENTARY APPLICATIONS

[75] Inventors: Jean-Bernard Egraz, Ecully; Jacques Mongoin, Champagne-Au-Mont-D'Or; Georges Ravet, Saint-Genis-Les-Ollieres; Jean-Marc Suau, Lyon, all of France

[73] Assignee: Coatex S.A., Genay, France

[ * ] Notice: The portion of the term of this patent subsequent to Feb. 6, 2015, has been disclaimed.

[21] Appl. No.: 383,991

[22] Filed: Feb. 6, 1995

Related U.S. Application Data

[63] Continuation of Ser. No. 974,271, Nov. 10, 1992, Pat. No. 5,432,238.

[30] Foreign Application Priority Data

Nov. 12, 1991 [FR] France ................................. 91 14137
Nov. 12, 1991 [FR] France ................................. 91 14140

[51] Int. Cl.$^6$ ........................................................ C08K 3/00
[52] U.S. Cl. ............................................ 524/547; 524/556
[58] Field of Search ........................................ 524/547, 556

[56] References Cited

U.S. PATENT DOCUMENTS 5,145,902  9/1992  Ravet et al. ............................. 524/547
5,278,248  1/1994  Egraz et al. .

OTHER PUBLICATIONS

FR2650594 Published Feb. 8, 1991 (French Equivalent of U.S. Pat. 5,145,902).

*Primary Examiner*—Bernard Lipman
*Attorney, Agent, or Firm*—Oblon, Spivak, McClelland, Maier & Neustadt, P.C.

[57] ABSTRACT

A grinding agent containing polymers and/or copolymers partially neutralized by magnesium, for aqueous suspensions of mineral substances to be used in pigmentary applications is disclosed.

A grinding agent composed of polymers and/or copolymers having a specific viscosity of between 0.3 and 0.8 and obtained by treatment, using one or several solvents, of a polymer and/or copolymer resulting from polymerization and/or copolymerization of acrylic and/or vinyl monomers comprising acid groups whose active acid sites are partially or completely neutralized to a degree of neutralization of 40 to 60%, including terminals, of the active acid sites using a neutralizing agent containing magnesium ions, and a degree of neutralization reaching 60% using a neutralizing agent containing sodium ions is disclosed.

A procedure for grinding in an aqueous suspension using said agent, as well as aqueous suspensions produced using said procedure and their applications to the fields of weight fillers, paper coating, paints, and plastics is also disclosed.

3 Claims, No Drawings

5,569,702

GRINDING AND/OR DISPERSING AGENT CONTAINING POLYMERS AND/OR COPOLYMERS PARTIALLY NEUTRALIZED BY MAGNESIUM FOR AQUEOUS SUSPENSIONS OF MINERAL SUBSTANCES, TO BE USED IN PIGMENTARY APPLICATIONS

This is a continuation, of application Ser. No. 07/974,271 filed on Nov. 10, 1992 U.S. Pat. No. 5,432,238.

BACKGROUND OF THE INVENTION

1. Field of the Invention

The present invention relates to a grinding and/or dispersing agent, a method of grinding and/or dispersing with such an agent, and a dispersion containing said agent.

2. Discussion of the Background

For a long time, conventional practice has included the use of mineral substances such as calcium carbonates and titanium dioxide for the preparation of industrial products intended for paints, paper coating, fillers for rubbers and synthetic resins, and others.

However, since these mineral substances do not have a natural lamellar or laminated structure facilitating their splitting, as is the case for certain substances such as aluminum silicates, generally known as kaolin, the specialist must, in order to use them in the pigment field, transform them by grinding in a very fine aqueous suspension whose constituent grains are as small as possible, i.e., of less than several microns.

Through the publications that have appeared in this area, the specialized literature reveals the importance and complexity of grinding in an aqueous medium of mineral substances, so as to obtain a quality of partial fineness allowing pigmentary applications. Thus, it is well known, in the special case of paper coating, that the coating material composed of mineral pigments such as kaolins, calcium carbonates, and titanium dioxides are placed in suspension in water, also contains binding agents and dispersants, as well as other additives such as thickening agents and coloring agents.

It is desirable to ensure that a suspension of this kind possesses a low, stable viscosity for the length of time it is stored, so as to facilitate handling and use, and, similarly, has as high a mineral substance content as possible, in order to reduce the quantity of water handled. A suspension, ideally uniting all of these basic properties, would allow the artisan to solve the well-known problems of grinding, storage, transport from the production site to the application site, and, finally, of transfer by pump during use.

Thus, to date those of skill in the art have been familiar with the use of grinding and/or aqueous dispersing agents for mineral particles formed by acrylic polymers and/or copolymers which are totally or partially neutralized by various neutralization agents (Patents Nos. FR2539137, FR2531444, FR2603042).

The artisan is also familiar with the use of a grinding and/or dispersing agent formed from the fraction of alkali acrylic polymers and/or copolymers which is totally neutralized by a single cation, and whose specific viscosity is between 0.3 and 0.8 (Patent No. FR2488814), or which is partially neutralized by a single cation such as sodium, potassium, lithium, or ammonium (EP0127388; EP0185458).

These various types of grinding and/or dispersing agents, according to prior art and other treatment or grinding procedures known to the artisan (EP0278880; FR2642415), make it possible to obtain aqueous suspensions of fine mineral particles, which have been thought, until now, to be stable over time, but for which the user experiences some handling problems, since they are often stored for several days or weeks without stirring, and thus must deal with an increase in viscosity of the unstirred suspension.

In fact, in the prior art, the viscosity of the aqueous suspension of mineral particles was generally measured using a Brookfield RVT-type viscosimeter at a temperature of 20° C. and a rate of rotation of the No. 3 moving component of 100 revolutions/minute:

(a) at the grinding apparatus outlet;

(b) after eight days of rest in the bottle, and after preliminary stirring of the resting suspension.

These two measurement parameters did not make it possible to bring to light "the increase of viscosity" of the aqueous mineral suspension, which is harmful to the user, who must handle concentrated suspensions which have been stored for several days without being stirred, and which is characterized by a Brookfield viscosity before stirring of more than 2000 mPa·s, obtained by measuring at 10 revolutions/minute.

Faced with these problems, the present inventors have found that aqueous mineral suspensions obtained according to prior art had high Brookfield viscosities if the measurement was made after extended storage without stirring the suspension preliminarily, as is generally the case the user of these suspensions is faced with.

Based on this finding, the present inventors have developed a grinding and/or dispersing agent and a grinding procedure in the presence of this agent, which, surprisingly, makes it possible to produce aqueous mineral suspensions meeting the aforementioned quality criteria.

Surprisingly, the objectives of the invention are achieved when between 40–60% of the active acid sites of an acrylic polymer, including terminals, are neutralized by a neutralization agent containing magnesium ions, while less than or equal to 60% of the active acid sites of the polymer are neutralized by a neutralizing agent containing sodium ions.

SUMMARY OF THE INVENTION

Thus, one object of the invention is to provide an improved grinding and/or dispersing agent.

Another object of the invention is to supply an improved grinding and/or dispersing agent in an aqueous suspension of coarse mineral substances, whose viscosity remains substantially the same over time.

A further object of the invention is to supply a grinding procedure in an aqueous suspension of mineral particles.

The object of the present invention is provided for by an improved grinding and/or dispersing agent in an aqueous suspension of coarse mineral substances, making it possible to obtain an aqueous suspension of fine mineral particles for pigmentary applications, such as an aqueous calcium carbonate suspension whose dry matter content is at least 70% by weight, in which the size of at least 90% of the essential particles is less than two μm after grinding, while the size of 60% of these particles is less than one μm.

The invention also provides for a grinding procedure in an aqueous medium of coarse mineral substances in the presence of said water-soluble grinding agent. This procedure gives aqueous suspensions of mineral substances whose viscosity remains stable over time, even if stirring of the suspensions should not be maintained, thereby ensuring significant ease of handling and use. This procedure is particularly well suited to grinding of an aqueous calcium carbonate suspension, whose dry matter content is at least 70% by weight, in which the size of at least 90% of the essential particles after grinding is less than two μm, while the size of at least 60% of these particles is less than one μm. Moreover, this invention concerns aqueous suspensions of mineral particles obtained by means of this procedure, and their applications.

These suspensions according to the invention, which are intended for pigmentary applications in which the size of at least 90% of the particles is less than two μm, and in which at least 60% of them measure less than one μm, have a low, stable viscosity over time, even when not stirred, i.e., a viscosity after resting for eight day of approximately the same value as that obtained at the outlet of the grinder following the grinding operation.

A final purpose of the invention is the use of these fine aqueous mineral suspensions in the fields of weight fillers, paper coating, and paints, and, after potential removal of the aqueous phase, in the field of polymer materials.

These objectives are achieved through the use, in the grinding process according to the invention, of the invention agent, which is produced by polymerization and/or copolymerization of acrylic and/or vinyl monomers, followed by fractionation by means of one or several polar solvents, in accordance with procedures known to the artisan.

DETAILED DESCRIPTION OF THE PREFERRED EMBODIMENTS

This agent according to the invention is characterized by the fact that it is formed from the fraction of said acid polymers and/or copolymers, whose active acid sites are partially or completely neutralized, undergoing a degree of neutralization of the active acid sites of between 40 and 60%, including terminals, by means of a neutralization agent incorporating magnesium ions, and a degree of neutralization of the active acid sites capable of reaching 60% using a neutralization agent incorporating sodium ions.

These acrylic polymers and/or copolymers are obtained from conventional radical polymerization procedures in the presence of polymerization regulators, such as hydroxylamine-based organic compounds and in the presence of polymerization catalysts such as peroxides and persalts, e.g., oxygenated water persulfate, sodium hypophosphite, hypophosphorous acid. The following monomers and/or co-monomers may be used: acrylic acid, methacrylic acid, itaconic acid, crotonic acid, fumaric acid, maleic anhydride acid, or, alternatively, isocrotonic acid, aconitic acid (cis or trans), mesaconic acid, sinapinic acid, undecylenic acid, angelic acid, canellic acid, or hydroxyacrylic acid, existing either as free acids or partially neutralized salts, acrolein, acrylamide, acrylonitrile, the esters of acrylic and methacrylic acids, and, in particular, dimethylaminoethyl methacrylate, vinylpyrrolidone, vinylcaprolactam, ethylene, propylene, isobutylene, diisobutylene, vinyl acetate, styrene, α-methyl styrene, and methyl vinyl ketone.

As a suitable polymerization medium may be water, methanol, ethanol, propanol, isopropanol, the butanols, or mixtures of these, or, alternatively, dimethylformamide, dimethyl sulfoxide, tetrahydrofuran, acetone, methyl ethyl ketone, ethyl acetate, butyl acetate, hexane, heptane, benzene, toluene, xylene, mercaptoethanol, tertiododecylmercapton, thiogylcolic acid and its esters, n-dodecylmercaptan, acetic acid, tartaric acid, lactic acid, citric acid, gluconic acid, glucoheptonic acid, and 2-mercaptopropionic acids, thiodiethanol, halogenated solvents such as carbon tetrachloride, chloroform, methylene chloride, and monopropylene glycol or diethyleneglycol ethers or mixtures of these latter.

The solution of the acid polymerization product thus obtained is potentially neutralized, partially or completely, to a degree of 40 to 60% using a neutralizing agent containing magnesium ions, and in a proportion of less than, or equal to, 60% using a neutralizing agent containing sodium ions.

The solution of the polymerization product, either acidic or neutralized in this manner, is then treated, using static or dynamic procedures known in the art, by one or several polar solvents belonging, in particular, to the group of methanol, ethanol, propanol, isopropanol, the butanols, acetone, and tetrahydrofuran, thereby producing a two-phase separation: —the least dense phase, containing the major fraction of the polar solvent and the acrylic polymer and/or copolymer fraction having low molecular weight, and—the densest aqueous phase containing the acrylic polymer and/or copolymer fraction having the highest molecular weight.

The desirable fraction composed of the acrylic polymers and/or copolymers according to the invention, whose specific viscosity is between 0.3 and 0.8, is collected.

This specific viscosity of the acrylic polymers and/or copolymers, symbolized by the letter "η" is determined in the following way.

A sample of the solution of the polymer and/or copolymer fraction collected is taken so as to obtain a solution corresponding to 2.5g of dry polymer and to 50 ml of a 60 g/l solution of sodium chloride. Next, a capillary viscosimeter with a Baume constant of 0.000105 is placed in a bath thermostat controlled to 25° C. which is used to measure the flow time of a given volume of the aforementioned solution containing the acrylic polymer and/or copolymer, and the flow time of the same volume of aqueous solution of sodium chloride from which said polymer and/or copolymer is absent. The viscosity "η" can then be calculated by means of the following equation.

$$\eta = \frac{\text{(flow time of the polymer solution)} - \text{(flow time of the NaCl solution)}}{\text{flow time of the NaCl solution}}$$

The capillary tube is generally chosen so that the flow time of the NaCl solution not containing the polymer and/or copolymer, will be approximately 90 to 100 seconds, thus giving very accurate specific viscosity measurements.

The temperature at which selection treatment of the acidic or alkali acrylic polymer and/or copolymer is effected is not crucial in itself, since it influences the coefficient of partition alone. It ranges between 10 and 80° C., and preferably between 20° C. and 60° C.

On the other hand, the ratio of the quantities of diluted water and of polar solvents is of prime importance, since it affects separation directly. Similarly, when separation is effected continuously using a centrifugal extractor, i.e., using a dynamic process, the ratios of the extracted fractions depends on centrifuging conditions.

It is also possible, and desirable, in certain cases, to further refine the selection of the fraction of the acrylic polymers and/or copolymers, by retreating the densest aqueous phase previously collected, using a new quantity of polar solvent which may be different from that, or those previously used, or which may be a mixture of polar solvents.

The liquid phase after treatment can be distilled to remove the solvent or solvents used for treatment.

The aqueous phase containing the fraction of acrylic polymers and/or copolymers whose specific viscosity ranges between 0.3 and 0.8 and corresponding to a mean molar mass by weight ($\overline{Mw}$) of between 1,000 and 10,000 g/mol, can be employed in this form as a grinding agent for mineral substances to be ground; however, it can also be treated using any conventional means to remove its aqueous phase and isolate the acrylic polymer and/or copolymer in the form of a fine powder, which may be used in that other form as a grinding agent.

In practice, the operation for grinding the mineral substance to be fined consists of grinding the mineral material with a grinding substance into very fine particles in an aqueous suspension containing the grinding agent. An aqueous suspension of the mineral substance to be ground is formed, in which the initial size of the grains is at most 50 µm, in a quantity such that the concentration in dry matter of this suspension is at least 70% by weight.

The grinding substance, whose granulometry is advantageously between 0.20 millimeter and 4 millimeters, is added to the suspension of the mineral substance to be ground. The grinding substance generally exists as particles of materials as varied as silicon oxide, aluminum oxide, zirconium oxide or mixtures of these latter, as well as very hard synthetic resins, steels, etc. An example of the composition of grinding substances of this kind is given in Patent No. FR 2203681, which describes grinding elements composed of from 30 to 70% by weight of zirconium oxide, 0.1 to 5% of aluminum oxide, and from 5 to 20% of silicon oxide. The grinding substance is preferably added to the suspension in a quantity such that the ratio by weight of the grinding material to the mineral substance to be ground is at least 2/1, this ratio preferably falling between the limits of 3/1 and 5/1.

The mixture of the suspension and of the grinding substance is then subjected to mechanical stirring, such as that generated in a conventional grinder incorporating microcomponents.

The grinding and/or dispersing agent according to the invention is also added to the mixture formed by the aqueous suspension of mineral substances and by the grinding substance, in a proportion of 0.2 to 2% by weight of the dried fraction of said polymers, in relation to the dry weight of the mineral substance to be fined.

The time required to achieve a high level of fineness of the mineral substance after grinding varies, depending on the nature and quantity of the mineral substances to be ground and on the stirring method used and the temperature of the medium during the grinding operation.

The mineral substances to be fined may come from very diverse sources, such as calcium carbonate and the dolomites, calcium sulfate, kaolins, and titanium dioxide, i.e., all mineral substances which must be ground to be usable in applications as various as paper coating, pigmenting of paints and coatings, fillers for rubbers and synthetic resins, imparting a dull finish to synthetic textiles, etc.

Thus, the application of the grinding and/or dispersing agent according to the invention allows the transformation, by grinding in an aqueous suspension containing a high concentration of dry matter, of coarse mineral substances into very fine particles, in which the size of at least 90% of these particles is always smaller than two µm, and in which the size of at least 60% is less than one µm; and this application makes it possible to obtain a suspension of very fine mineral substances whose viscosity is low and stable over time.

Having generally described this invention, a further understanding can be obtained by reference to certain specific examples which are provided herein for purposes of illustration only and are not intended to be limiting unless otherwise specified.

EXAMPLE 1

The example involves the preparation of a suspension of coarse calcium carbonate subjected to grinding to fine it into a microparticulate suspension. To this end, a suspension of coarse calcium carbonate was prepared from a natural calcium carbonate having an average diameter of 50 micrometers, by using:

for Test No. 1, illustrating prior art, the densest fraction of a sodium polyacrylate obtained from isopropanol fractionation of a sodium polyacrylate whose specific viscosity of 0.525 and obtained by radical polymerization and total neutralization (100% of the active acid sites) using sodium hydroxide;

for Test no. 2, also illustrating prior art, the densest fraction of a mixed sodium and calcium polyacrylate obtained by isopropanol fractionation of a mixed sodium and calcium polyacrylate having a specific viscosity of 0.525, obtained by radical polymerization and total neutralization, using sodium hydroxide and lime in a ratio corresponding to neutralization of the active acid sites, in the proportion of 70% sodium to 30% calcium;

for Test No. 3, still illustrating prior art, the densest fraction of a sodium polyacrylate obtained by isopropanol fractionation of a sodium polyacrylate whose specific viscosity is 0.525 and which is obtained by radical polymerization and partial neutralization (66% of the active acid sites) using sodium hydroxide;

for Test No. 4, which illustrates the invention, the densest fraction of a mixed sodium and magnesium polyacrylate obtained by isopropanol fractionation of a mixed sodium and magnesium polyacrylate whose specific viscosity is 0.525 and which is obtained by total neutralization (100% of the active acid sites) using sodium hydroxide and magnesium hydroxide, in a ratio corresponding to neutralization of the active acid sites in a proportion of 50% by the sodium to 50% by the magnesium.

For each test, an aqueous suspension of calcium carbonate taken from the Organ (France) deposit and having a granulometry of less than 10 microns was prepared.

This suspension had a dry matter concentration of 76% by weight of the total weight.

The grinding agent was added to this suspension in the quantities indicated in the following table, expressed as percent of dry weight of the Torac weight of the dry calcium carbonate to be ground.

The suspension circulated in a Dyno-Mill grinder incorporating a stationary cylinder and a rotating pulse generator, in which the grinding substance was corundum balls having a diameter of between 0.6 millimeter and 1.0 millimeter.

The total volume taken up by the grinding substance was 1,150 cubic centimeters, and its weight, 2,900 g.

The grinding chamber had a volume of 1,400 cubic centimeters.

The circumferential speed of the grinder was 10 meters/second.

The calcium carbonate suspension was recycled at the rate of 18 liters/hour.

The outlet of the Dyno-Mill grinder was equipped with a 200-micron mesh separator allowing separation of the ground suspension and the grinding substance.

The temperature during each grinding test was kept at approximately 60° C.

Following the grinding operation (To), a sample of the pigmentary suspension, in which the size of 80% of the particles was less than one micron, was collected in a bottle, and the viscosity was measured using a Brookfield RVT viscosimeter at a temperature of 20° C. and a speed of rotation of 10 revolutions/minute with the suitable moving component.

After the suspension had rested in the bottle for eight days, the viscosity was measured by inserting into the unstirred bottle the suitable moving component of the Brookfield RVT viscosimeter, at a temperature of 20° C., and a speed of rotation of 10 revolutions/minute (AVAG viscosity: before stirring).

All experimental results are recapitulated in Table 1.

variable proportions of magnesium.

These tests were conducted based on the same experimental criteria as those in Example 1.

All experimental results appear in Table 2.

TABLE 1

| | GRINDING AGENT USED | | | Brookfield Viscosity of the suspension (at 20° C. in mPA · s) | |
|---|---|---|---|---|---|
| | NEUTRALIZATION Percentage | | | | |
| Test No. | of acid groups neutralized | Neutralizing cation | Consumption of agent in %/dry/dry | To 10 T/mn | AVAG after eight days 10 T/mn |
| 1* | 100 | Na | 0.86 | 1,400 | 8,290 |
| 2* | 70/30 | Na/Ca | 1.05 | 1,250 | 2,390 |
| 3* | 66 | Na | 1.25 | 1,500 | 6,750 |
| 4** | 50/50 | Na/Mg | 0.98 | 1,040 | 1,040 |

*Prior Art
**Invention
AVAG: Measurement of the viscosity prior to stirring of the suspension A reading of Table 1 reveals that only the calcium carbonate ground using the invention agent (Test No. 4) has a Brookfield viscosity, as measured at 10 revolutions/minute after eight days at rest (without preliminary stirring), which

TABLE 2

| | GRINDING AGENT USED | | | Brookfield Viscosity of the suspension (at 20° C. in mPA · s) | |
|---|---|---|---|---|---|
| | NEUTRALIZATION Percentage | | | | |
| Test No. | of acid groups neutralized | Neutralizing cation | Consumption of agent in %/dry/dry | To 10 T/mn | AVAG after eight days 10 T/mn |
| 5 | 70/30 | Na/Mg | 1.05 | 1,330 | 3,590 |
| 6** | 60/40 | Na/Mg | 1.03 | 1,200 | 1,900 |
| 7** | 55/45 | Ma/Mg | 0.9 | 1,210 | 1,510 |
| 8** | 50/50 | Na/Mg | 0.98 | 1,040 | 1,040 |
| 9** | 45/55 | Na/Mg | 1.02 | 1,250 | 1,190 |
| 10** | 40/60 | Na/Mg | 1.09 | 1,390 | 1,635 |
| 11 | 30/70 | Na/Mg | 1.16 | 1,160 | 1,730 |
| 12 | 50/45 | Na/Mg | 1.08 | 1,420 | 1,900 |

**Invention
AVAG: Measurement of the viscosity prior to stirring of the suspension is appreciably less than 2,000 mPa·s, while all of the tests of the examples carried out using an agent according to prior art give viscosities of more than 2,000 mPa·s.

Thus, a reading of Table 1 discloses the increased viscosity in suspensions of ground calcium carbonate using agents according to prior art, while the grinding and/or dispersing agent according to the invention makes it possible to obtain stability of the viscosity of the calcium carbonate suspensions even prior to stirring,

EXAMPLE 2

A second group of tests (Tests Nos. 5–12) involves preparation and grinding of an aqueous suspension of the same calcium carbonate at the same dry matter concentration in the presence of the densest fraction obtained by isopropanol fractionation of the same polyacrylic acid having a specific viscosity of 0.525 and neutralized using A reading of Table 2 reveals the extraordinary rheological results yielded by the invention, and the fact that the use of the agent according to the invention makes it possible to cross the threshold of profitability during practical tests.

Indeed, two criteria are considered by the user, the economic and the rheological aspects. An excess quantity of the grinding agent entails an excess cost of production of the fine calcium carbonate suspensions.

Thus, consumption of the grinding and/or dispersing agent in the grinding operation based on the invention must not exceed approximately 1.1% of the dry dispersing agent in relation to the dry weight of the calcium carbonate, so as to give a suspension in which the size of 80% of the particles is less than one micron and the concentration of dry matter is 76%. Tests Nos. 6 and 10 thus establish the limits of the invention.

As regards rheology, the user, who must handle concentrated suspensions stored for several days without being stirred, wishes to have suspensions whose viscosity is virtually identical to that of the suspensions leaving the grinder, this viscosity always being less than 2,000 mpa·s. This is the extraordinary result obtained for the first time using the agent based on the invention (Tests Nos. 6 to 10 and 12, and, in particular, Tests 7 to 9).

EXAMPLE 3

This example (Tests Nos. 13 and 14) involves the preparation and grinding of an aqueous suspension of the same calcium carbonate at the same dry matter concentration and in the presence of the densest fraction obtained by isopropanol fractionation of the same polyacrylic acid having a specific viscosity of 0.525 and neutralized using different neutralizing agents containing polyfunctional ions other than magnesium, e.g., calcium.

Thus, in Test No. 13 grinding is carried out using the same fraction of polyacrylic acid as that mentioned above, which is neutralized with sodium hydroxide and lime in a ratio corresponding to neutralization of the active acid sites, in a proportion of 70% by the sodium and 30% by the calcium. Test No. 14 involves the same fraction of polyacrylic acid neutralized by sodium hydroxide and lime in a ratio corresponding to neutralization of 55% of the active acid sites by means of the sodium, and 45% by means of the calcium. 20 These tests were conducted based on the same experimental criteria as those applied in Example 1.

All results are recorded in Table 3.

revolutions/minute after eight days at rest and without preliminary stirring, of less than 2,000 mPa·s (Tests Nos. 13 and 14).

EXAMPLE 4

This example (Tests Nos. 15–17) involves the preparation and grinding of an aqueous suspension of the same calcium carbonate at the same dry matter concentration and in the presence of the densest fraction obtained by isopropanol fractionation of the same polyacrylic acid having a specific viscosity of 0.525 and neutralized at a rate of 50% by the magnesium ion and 50% by using different monovalent neutralizing agents.

These different monovalent neutralizing agents are, in Test No. 15, ammonium, lithium in Test No. 16, and potassium in Test No. 17.

These tests were conducted using the same experimental criteria as those used in Example 1.

All results are recorded in Table 4.

TABLE 3

| Test No. | GRINDING AGENT USED | | | Brookfield Viscosity of the suspension (at 20° C. in mPA · s) | |
|---|---|---|---|---|---|
| | NEUTRALIZATION Percentage | | | | |
| | of acid groups neutralized | Neutralizing cation | Consumption of agent in %/dry/dry | To 10 T/mn | AVAG after eight days 10 T/mn |
| 13 | 70/30 | Na/Ca | 1.05 | 1,250 | 2,390 |
| 14 | 55/45 | Na/Ca | 1.3 | 1,500 | 3,300 |
| 7** | 55/45 | Na/Mg | 0.9 | 1,210 | 1,510 |

**Invention
AVAG: Measurement of the viscosity prior to stirring of the suspension A reading of Table 3 reveals that use of another neutralizing polyfunctional cation such as calcium, even in different proportions, does not yield a fine calcium carbonate suspension having a Brookfield viscosity, as measured at 10

TABLE 4

| Test No. | GRINDING AGENT USED | | | Brookfield Viscosity of the suspension (at 20° C. in mPA · s) | |
|---|---|---|---|---|---|
| | NEUTRALIZATION Percentage | | | | |
| | of acid groups neutralized | Neutralizing cation | Consumption of agent in %/dry/dry | To 10 T/mn | AVAG after eight days 10 T/mn |
| 15 | 50/50 | NH$_4$/Mg | It is not possible to obtain a granulometry equivalent to 80% < 1 μm | | |
| 16 | 50/50 | Li/Mg | 0.89 | 1,620 | 3,800 |
| 17 | 50/50 | K/Mg | 1.11 | 1,800 | 2,700 |

AVAG: Measurement of the viscosity prior to stirring of the suspension.

A reading of Table 4 reveals that the sodium ion cannot advantageously be replaced by another monovalent ion.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. An aqueous suspension of fine mineral substances refined by a process for grinding an aqueous suspension of coarse mineral substances intended for pigmentary applications, comprising:

(i) preparing an aqueous suspension of a coarse mineral substance;

(ii) adding a grinding agent comprising: a polymer selected from the group consisting of acrylic polymers, vinyl polymers, acrylic and vinyl copolymers, and a mixture thereof: wherein said polymer contains acid groups which are partially or completely neutralized and is obtained by treatment, using one or several polar solvents according to static or dynamic procedures, and by the selection of the fraction of having the desired molecular weight, wherein the active acid sites of said polymer are completely or partially neutralized such that the percentage of said active acid sites neutralized by magnesium ions ranges between 45 and 55, including terminals, and such that up to 55% of said active acid sites of said agent are neutralized by sodium ions.

(iii) adding a grinding substance to said suspension; and (iv) grinding said mixture thus constituted; wherein the size of at least 90% of the particles in the ground substance is less than two microns, and the size of at least 65% of them is less than one micron.

2. The aqueous suspension of fine mineral substances according to claim 1, wherein the Brookfield viscosity of said suspension as measured without stirring after at least eight days of storage does not exceed 1,510 mpa·s at 10 revolutions/minute.

3. The aqueous suspension of fine mineral substances according to claim 1, wherein the size of at least 80% of the particles in the ground substance is less than 1 micron.

* * * * *